(12) United States Patent
Armstrong-Crews et al.

(10) Patent No.: US 12,216,474 B1
(45) Date of Patent: Feb. 4, 2025

(54) VIBROMETRY-BASED BEHAVIOR PREDICTION FOR AUTONOMOUS VEHICLE APPLICATIONS

(71) Applicant: Waymo LLC, Mountain View, CA (US)

(72) Inventors: Nicholas Armstrong-Crews, Mountain View, CA (US); Bryce Remesch, Hollis, NH (US)

(73) Assignee: Waymo LLC, Mountain View, CA (US)

( * ) Notice: Subject to any disclaimer, the term of this patent is extended or adjusted under 35 U.S.C. 154(b) by 168 days.

(21) Appl. No.: 17/302,486

(22) Filed: May 4, 2021

(51) Int. Cl.
| G08G 1/052 | (2006.01) |
| G05D 1/00 | (2006.01) |
| G06N 20/00 | (2019.01) |
| G08G 1/01 | (2006.01) |

(52) U.S. Cl.
CPC ......... *G05D 1/0221* (2013.01); *G05D 1/0255* (2013.01); *G06N 20/00* (2019.01); *G08G 1/0125* (2013.01); *G08G 1/052* (2013.01)

(58) Field of Classification Search
CPC ............... G05D 1/0221; G05D 1/0255; G05D 2201/0213; G06N 20/00; G08G 1/0125; G08G 1/052; B60W 10/00; B60W 60/00276; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00
USPC ........................................................ 701/26
See application file for complete search history.

(56) References Cited

U.S. PATENT DOCUMENTS

| 8,112,223 B2 | 2/2012 | Jordan et al. |
| 9,851,470 B2 | 12/2017 | Henderson et al. |
| 10,262,234 B2 | 4/2019 | Li et al. |
| 10,620,631 B1* | 4/2020 | Abeloe ................. G10L 13/047 |
| 10,884,422 B2 | 1/2021 | Zhang et al. |
| 10,891,744 B1 | 1/2021 | Wyffels |
| 11,029,395 B1 | 6/2021 | Barber et al. |
| 11,113,873 B1 | 9/2021 | Bosse et al. |
| 11,328,210 B2* | 5/2022 | Mondello .............. G06N 3/088 |
| 11,448,735 B2 | 9/2022 | O'Keeffe |
| 2005/0099637 A1 | 5/2005 | Kacyra et al. |
| 2005/0285774 A1 | 12/2005 | Wittenberg et al. |

(Continued)

FOREIGN PATENT DOCUMENTS

| CN | 111612818 A | 9/2020 |
| EP | 3252501 A1 | 12/2017 |

(Continued)

OTHER PUBLICATIONS

International Search Report and Written Opinion dated Feb. 18, 2022, on application No. PCT/US2021/057622, 12 pages.

(Continued)

*Primary Examiner* — Marc Burgess
*Assistant Examiner* — John D Holman
(74) *Attorney, Agent, or Firm* — Lowenstein Sandler LLP

(57) ABSTRACT

Aspects and implementations are related to systems and techniques enabling predictions of a motion change in a moving vehicle, predictions of an onset of a motion of an idling vehicle, and classification of vehicles based, at least in part, on vibrometry data obtained using light detection and ranging devices.

20 Claims, 9 Drawing Sheets

(56) References Cited

U.S. PATENT DOCUMENTS

| | | |
|---|---|---|
| 2007/0219720 A1 | 9/2007 | Trepagnier et al. |
| 2010/0161225 A1 | 6/2010 | Hyung et al. |
| 2012/0064949 A1* | 3/2012 | Kavounas ............ H04M 19/045 |
| | | 455/567 |
| 2014/0028842 A1 | 1/2014 | Abramson et al. |
| 2014/0307247 A1 | 10/2014 | Zhu et al. |
| 2014/0347207 A1 | 11/2014 | Zeng et al. |
| 2015/0107358 A1 | 4/2015 | Parke et al. |
| 2015/0198711 A1 | 7/2015 | Zeng et al. |
| 2017/0097410 A1 | 4/2017 | Liu et al. |
| 2018/0136321 A1 | 5/2018 | Verghese et al. |
| 2018/0283851 A1 | 10/2018 | Watanabe et al. |
| 2018/0335787 A1 | 11/2018 | Zeng et al. |
| 2018/0348343 A1 | 12/2018 | Achour et al. |
| 2019/0011541 A1 | 1/2019 | O'Keeffe |
| 2019/0079193 A1 | 3/2019 | Gunnam |
| 2019/0120955 A1 | 4/2019 | Zhong et al. |
| 2019/0138822 A1 | 5/2019 | Yao et al. |
| 2019/0302767 A1 | 10/2019 | Sapp et al. |
| 2019/0317219 A1 | 10/2019 | Smith et al. |
| 2019/0318206 A1 | 10/2019 | Smith et al. |
| 2020/0041619 A1 | 2/2020 | Maheshwari et al. |
| 2020/0182992 A1 | 6/2020 | Kellner et al. |
| 2020/0201351 A1 | 6/2020 | Armstrong-Crews et al. |
| 2020/0301013 A1 | 9/2020 | Banerjee et al. |
| 2020/0302237 A1 | 9/2020 | Hennings Yeomans et al. |
| 2020/0309957 A1 | 10/2020 | Bhaskaran et al. |
| 2020/0371228 A1 | 11/2020 | Wang |
| 2020/0398894 A1 | 12/2020 | Hudecek et al. |
| 2020/0400821 A1 | 12/2020 | Baker et al. |
| 2021/0001868 A1 | 1/2021 | Ahn et al. |
| 2021/0024069 A1* | 1/2021 | Herman ............ B60W 60/00274 |
| 2021/0049779 A1 | 2/2021 | Harviainen |
| 2021/0056713 A1 | 2/2021 | Rangesh et al. |
| 2021/0097723 A1 | 4/2021 | Kim et al. |
| 2021/0141092 A1 | 5/2021 | Chen et al. |
| 2021/0173055 A1 | 6/2021 | Jian et al. |
| 2021/0229657 A1 | 7/2021 | Herman et al. |
| 2021/0255307 A1 | 8/2021 | Bongio Karrman et al. |
| 2021/0256321 A1 | 8/2021 | Gerardo Castro et al. |
| 2021/0261152 A1 | 8/2021 | Meijburg et al. |
| 2021/0261159 A1 | 8/2021 | Pazhayampallil et al. |
| 2021/0339738 A1 | 11/2021 | Lashkari et al. |
| 2021/0390331 A1 | 12/2021 | Kellner |
| 2021/0396887 A1 | 12/2021 | Schmalenberg |
| 2022/0058402 A1 | 2/2022 | Hunt |
| 2022/0119002 A1 | 4/2022 | Ladd |
| 2022/0122363 A1 | 4/2022 | Liong et al. |
| 2022/0128995 A1 | 4/2022 | Chen et al. |
| 2022/0146676 A1 | 5/2022 | Armstrong-Crews et al. |
| 2022/0229164 A1 | 7/2022 | Steinberg et al. |
| 2022/0262100 A1 | 8/2022 | Chandler et al. |
| 2022/0276375 A1 | 9/2022 | Armstrong-Crews |
| 2022/0327719 A1 | 10/2022 | Shaag et al. |
| 2023/0076905 A1 | 3/2023 | Wyffels |

FOREIGN PATENT DOCUMENTS

| | | |
|---|---|---|
| EP | 3285230 A1 | 2/2018 |
| EP | 3367121 A1 | 8/2018 |
| EP | 3525000 A1 | 8/2019 |
| EP | 3367121 B1 | 4/2020 |
| EP | 3745158 A1 | 12/2020 |
| JP | 2012518793 A | 8/2012 |
| JP | 2015035019 A | 2/2015 |
| JP | 2019049774 A | 3/2019 |
| KR | 20200011813 A | 2/2020 |
| WO | 2014168851 A1 | 10/2014 |
| WO | 2018127789 A1 | 7/2018 |
| WO | 2019154536 A1 | 8/2019 |
| WO | 2020210276 A1 | 10/2020 |
| WO | 2022087308 A1 | 4/2022 |
| WO | 2022094429 A1 | 5/2022 |

OTHER PUBLICATIONS

International Search Report and Written Opinion dated Feb. 15, 2022, on application No. PCT/US2021/056105, 10 pages.
International Search Report and Written Opinion dated Feb. 23, 2022, on application No. PCT/US2021/057623, 10 pages.
Aeye iDAR "iDAR is Smarther than LiDAR", aeye.ai/idar/, retrieved Oct. 20, 2020, 11 pages.
Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.
Cameron O., "An Introduction to LIDAR: The Key Self-Driving Car Sensor," Voyage, May 9, 2017, pp. 1-21.
Extended European Search Report for European Application No. 22175897.2, mailed Nov. 2, 2022, 10 Pages.
International Preliminary Report on Patentability for International Application No. PCT/US2021/056105, mailed May 4, 2023, 7 Pages.
International Preliminary Report on Patentability for International Application No. PCT/US2021/057622, mailed May 11, 2023, 7 Pages.
International Preliminary Report on Patentability for International Application No. PCT/US2021/057623, mailed May 11, 2023, 7 Pages.
Office Action for Japanese Patent Application No. JP20230520411, mailed Dec. 26, 2023, 13 Pages.
Extended European Search Report for European Application No. 21883928.0, mailed Aug. 13, 2024, 11 Pages.
Hu Y., et al., "Robust 6-DOF Motion Sensing for an Arbitrary Rigid Body by Multi-view Laser Doppler Measurements," Optics Express, Nov. 27, 2017, vol. 25(24), pp. 30371-30387.

* cited by examiner

VIBROMETRY-BASED BEHAVIOR PREDICTION FOR AUTONOMOUS VEHICLE APPLICATIONS

TECHNICAL FIELD

The instant specification generally relates to autonomous vehicles. More specifically, the instant specification relates to improving autonomous driving systems and components using vibrometry sensing data to assist in predicting behavior of movable objects and classification of vehicles in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
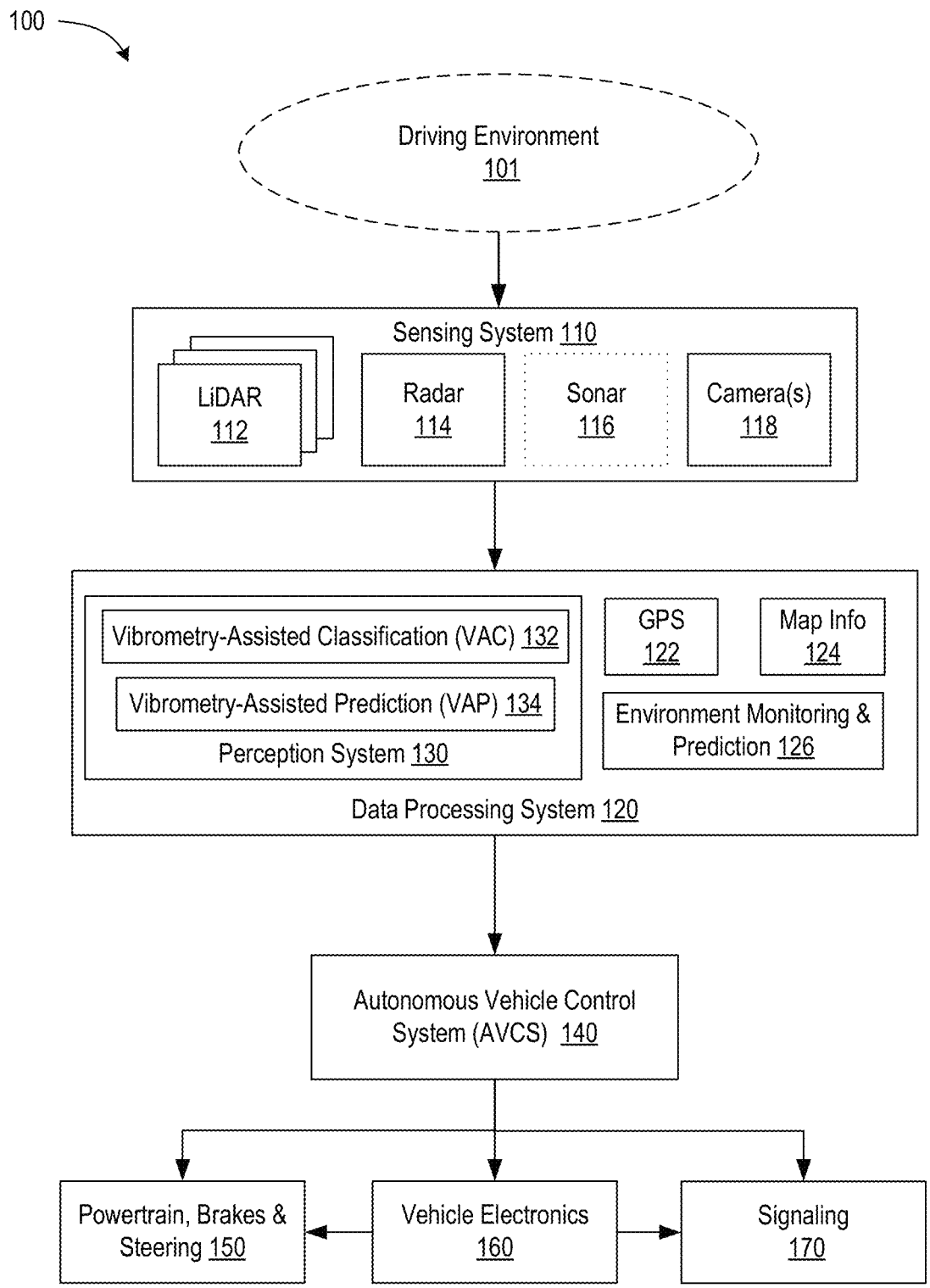
FIG. 1 is a diagram illustrating components of an example autonomous vehicle capable of using vibrometry for behavior prediction and object identification, in accordance with some implementations of the present disclosure.

In one implementation, disclosed is a method of determining, by a sensing system of an autonomous vehicle (AV), a first vibration frequency associated with a first state of a movable object at a first time and a second vibration frequency associated with a second state of the movable object at a second time, predicting, based on an identification that the second vibration frequency is different from the first vibration frequency, a motion change of the movable object, and causing a driving path of the AV to be determined in view of the predicted motion change.

In another implementation, disclosed is a method of obtaining, by a sensing system of an AV, a spectral representation of vibrations of a movable object, applying a trained machine learning model to an input comprising the obtained spectral representation of vibrations to identify a type of the movable object, and causing a driving path of the AV to be determined in view of the identified type of the movable object.

In another implementation, disclosed is a system comprising a sensing system of an AV, the sensing system to: determine a first vibration frequency associated with vibrations of an engine of a first vehicle at a first time, wherein the first vehicle is an idling stationary vehicle, and a control system of the AV communicatively coupled to the sensing system, the control system to: responsive to the determined first vibration frequency, execute a driving maneuver comprising at least one of: a change in a speed of the AV or a change in a driving direction of the AV.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover an entire 360-degree view by using a series of consecutive sensing frames identified with timestamps. As a result, each sector in space is sensed in time increments $\Delta\tau$, which are determined by the angular velocity of the lidar's scanning speed. Sometimes, an entire 360-degree view of the environment can be obtained over a scan of the lidar. Alternatively, any smaller sector, e.g., a 1-degree sector, a 5-degree sector, a 10-degree sector, or any other sector can be scanned, as desired.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame and to what types (e.g., cars, trucks, buses, motorcycles, pedestrians, etc.) the objects in the frame belong.

ToF lidars are typically used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals can be short enough so that between consecutive signals (frames) the object does not change its position appreciably in relation to other objects of the environment, but still long enough to allow the lidar to accurately detect the changes in the object's position. However, ToF lidar devices are generally incapable of determining velocities of objects based on a single sensing frame.

Coherent lidars (and, in some systems, coherent radars) take advantage of a phase information encoded into transmitted signals (and carried by the emitted electromagnetic waves to the target and back) and provide additional functionality unavailable in the standard ToF lidar technology. A coherent lidar detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" velocity. A coherent lidar allows to associate a radial velocity with the return points of the point cloud. This additional information (which may be obtained separately or together with the range information) helps to identify the state of the motion of various objects faster and more accurately than a ToF lidar.

Although the state of an object, as determined by coherent lidar data, can include position and velocity, determining acceleration of the object may be more difficult. More than one sensing frame may be required to relate a change in the (radial) velocity $V_r(t_2)-V_r(t_1)$ to the time difference between the frames, $t_2-t_1$. Additional frames can improve the accuracy of acceleration detection (provided that the acceleration remains constant), but can take additional time. Moreover, if acceleration of the object changes in the meantime, the acceleration determined from multiple frames may be some average acceleration, rather than an instantaneous acceleration. Furthermore, while lidar velocimetry can be capable of tracking an object that is already in motion, detecting objects that are about to start moving or about to experience a sudden motion change can be problematic. For example, a parked or stopped car that is about to veer onto a roadway or a car that is about to begin an overtaking maneuver or change lanes can be identified with some time delay, when the respective driving maneuver is already under way. An earlier detection and prediction of such motion changes is advantageous from both the safety and efficiency standpoints. An autonomous vehicle capable of prediction and early detection of sudden behavior changes of various movable objects can avoid hard braking and steering and, generally, is capable of providing a higher quality ride, decreasing energy consumption, and reducing risks of contact with other objects.

Aspects and implementations of the present disclosure address these and other shortcomings of the existing technologies by enabling methods of Doppler vibrometry-assisted prediction of motion changes. In some implementations, lidar sensing can be used to identify vibration frequencies of a movable object (e.g., a vehicle), such as frequencies associated with engine vibrations. A lidar beam reflected from the object can be frequency modulated with one or more vibration frequencies. Using such vibrometry data, a parked car with the engine running can be identified as an object that can potentially veer into the roadway. Likewise, a car that is already in motion can change its engine frequency (e.g., revolutions per minute or RPM) prior to performing a driving maneuver, such as overtaking, lane change, engine braking, and the like. In some implementations, as described in more detail below, an RPM change can be associated with an acceleration of the object and a specific value of the acceleration can be ascertained based on the associated RPM change. Additionally, various vehicles can have distinct spectra of vibration frequencies and a trained machine learning model can be used to identify at least a type of a vehicle and, in some instances, a make and model of the vehicle. The machine learning model can be trained using training vibration spectra and, in some instances, images of the vehicles whose vibration spectra are being input into the model.

FIG. 1 is a diagram illustrating components of an example autonomous vehicle (AV) 100 capable of using vibrometry for behavior prediction and object identification, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 110 can include a radar unit 114, which can be any system that utilizes radio or microwave frequency signals to sense objects within the driving environment 101 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The sensing system 110 can include one or more lidar sensors 112 (e.g., lidar rangefinders), which can be a laser-based unit capable of determining distances (e.g., using ToF technology) to the objects in the driving environment 101. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 112 units can be mounted on AV 100, e.g., at separate locations, to provide additional information about a transverse component of the velocity of the reflecting object.

The lidar sensor(s) 112 can include one or more laser sources producing and emitting signals and one or more detectors of the signals reflected back from the objects. The lidar sensor(s) 112 can include spectral filters to filter out spurious electromagnetic waves having wavelengths (frequencies) that are different from the wavelengths (frequencies) of the emitted signals. In some implementations, the lidar sensor(s) 112 can include directional filters (e.g., apertures, diffraction gratings, and so on) to filter out electromagnetic waves that can arrive at the detectors along directions different from the retro-reflection directions for the emitted signals. The lidar sensor(s) 112 can use various other optical components (lenses, mirrors, gratings, optical films, interferometers, spectrometers, local oscillators, and the like) to enhance sensing capabilities of the sensors.

In some implementations, the lidar sensor(s) 112 can perform a 360-degree scanning in a horizontal direction. In some implementations, the lidar sensor(s) 112 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate, generally, in the near-infrared range of wavelengths, but may also include sensing technology that operates at other wavelengths.

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive the lidar sensing data (coherent Doppler data and incoherent ToF data) to determine distances to various objects in the environment 101 and velocities (radial and, in some implementations, transverse, as described below) of such objects. In some implementations, the perception system 130 can use the lidar data in combination with the data captured by the camera(s) 118. In one example, the camera(s) 118 can detect an image of a rock partially obstructing a traffic lane. Using the data from the camera(s) 118, the perception system 130 can be capable of determining the angular size of the rock, but not the linear size of the rock. Using the lidar data, the perception system 130 can determine the distance from the rock to the AV and, therefore, by combining the distance information with the angular size of the rock, the perception system 130 can determine the linear dimensions of the rock as well.

In another implementation, using the lidar data, the perception system 130 can determine how far a detected object is from the AV and can further determine the component of the object's velocity along the direction of the AV's motion. Furthermore, using a series of quick images obtained by the camera, the perception system 130 can also determine the lateral velocity of the detected object in a direction perpendicular to the direction of the AV's motion. In some implementations, the lateral velocity can be determined by recognizing an edge of the object (e.g., using horizontal lidar scanning) and further determining how quickly the edge of the object is moving in the lateral direction.

The perception system 130 can include one or more modules to facilitate vibrometry-assisted perception. A vibrometry-assisted classification module (VAC) 132 can process data provided by the sensing system 110, including vibration frequencies (of various vehicles. Vibrations can be associated with engine revolutions per minute (RPM), transmission system rotations (e.g., rotations of gearbox, cardan shaft, crankshaft, etc.), resonances of a vehicles' frame and/or a body, or various other mechanical vibrations (e.g., induced by wheels motion or air drag) present in moving or idling vehicles of the driving environment 101. VAC 132 can be capable of identifying a type of the vehicle, e.g., a car, a sports car, a light truck, a heavy truck (e.g., a semi-truck), a bus, a rail vehicle (e.g., a tram or a train), and the like, based on a spectral representation of vibrations (also referred to as "vibration spectra" herein) sensed by lidar sensor(s) 112. Vibration spectra are unique for different type/makes/models of the vehicles (and may even be sensitive to the age of the vehicles. This is because different vehicles (even belonging to the same type, e.g., passenger cars) have different designs and are made of different materials with various vehicle parts interacting with other parts in a different way, making sound vibrations propagating with different speeds within the vehicle, having different resonant frequencies, and so on. In some implementations, VAC 132 can include one or more machine learning models (MLMs) trained to use, as input, vibration spectra and output a type of the vehicle (e.g., spectrogram/periodogram data, which may be presented in a digital form or in the form of images/plots/etc.). In some implementations, MLMs can be trained using additional inputs, such as images of the vehicles, images that provide contextual information (e.g., images indicating a type of a driving environment, e.g., city driving, highway driving, off-road driving, etc.), and so on. In some implementations, contextual information can be provided not as an image but as an explicit digital category (e.g., 0—city driving, 1—highway driving, etc.) specified by perception system 134 and determined from other data received from the sensing system 110. In some implementations, the auxiliary data may include a speed (or an approximate range of speeds, e.g., 50-70 mph) of the vehicle.

A vibrometry-assisted prediction module (VAP) 134 can similarly process vibrometry data provided by the sensing system 110 to identify changes in motion (often referred to as "motion changes" herein) of various movable objects based on vibrometry data. In some implementations, lidar sensor(s) 112 can obtain a vibration spectrum (e.g., one or more frequencies of vibrations) of a vehicle and identify the spectra as associated with RPM of an idling but operating engine of a vehicle that is stationary, e.g., at a side of the road. VAP 134 can receive this data and can make a determination that the vehicle is capable of veering into traffic at any moment. In some instances, VAP 134 can monitor idling vehicle sensing data provided by lidar sensor(s) 112 over a certain time period (e.g., while the AV 100 is driving by) and can further determine that the vehicle engine RPM has increased. VAP 134 can, therefore, predict that the vehicle is about to begin its motion. In some implementations, the monitored vehicle can already be in motion, e.g., travelling along a lane adjacent to a lane occupied by the AV 100. In such instances, VAP 134 can determine a moment when the vehicle engine RPM has increased and, responsive to this determination, can predict that the vehicle is likely to change lanes, e.g., cut in front of the AV 100.

The perception system 130 can further receive information from a GPS transceiver (not shown) configured to obtain information about the position of the AV relative to Earth. The GPS data processing module 122 can use the GPS data in conjunction with the sensing data to help accurately determine location of the AV with respect to fixed objects of the driving environment 101, such as roadways, lane boundaries, intersections, sidewalks, crosswalks, road signs, surrounding buildings, and so on, locations of which can be provided by map information 124. In some implementations, the data processing system 120 can receive non-electromagnetic data, such as sonar data (e.g., ultrasonic sensor data), temperature sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with VAP 134. Although not depicted explicitly in FIG. 1, in some implementations, VAP 134 can be integrated into the environment monitoring and prediction component 126.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, VAP 134 can determine that an idling or moving object has been experiencing a change in vibration spectra that indicates an engine RPM increase. Depending on the road conditions (e.g., street driving, highway driving, etc.) VAP 134 can predict that the vehicle is about to veer into traffic from the curbside, change lanes, begin engine braking, and so on. The predictions received by AVCS 140 from the data processing system 120 can cause AVCS 140 to slow down the AV 100 or cause the AV 100 to change lanes. The AVCS 140 can output instructions to the powertrain, brakes, and steering 150 (directly or via the vehicle electronics 160) to 1) reduce, by modifying the throttle settings, a flow of fuel to the engine to decrease the engine RPM, 2) downshift, via an automatic transmission, the drivetrain into a lower gear, 3) engage a brake unit to reduce (while acting in concert with the engine and the transmission) the vehicle's speed until a safe speed is reached, 4) perform, using a power steering mechanism, a steering maneuver, and so on.

Figure 2:
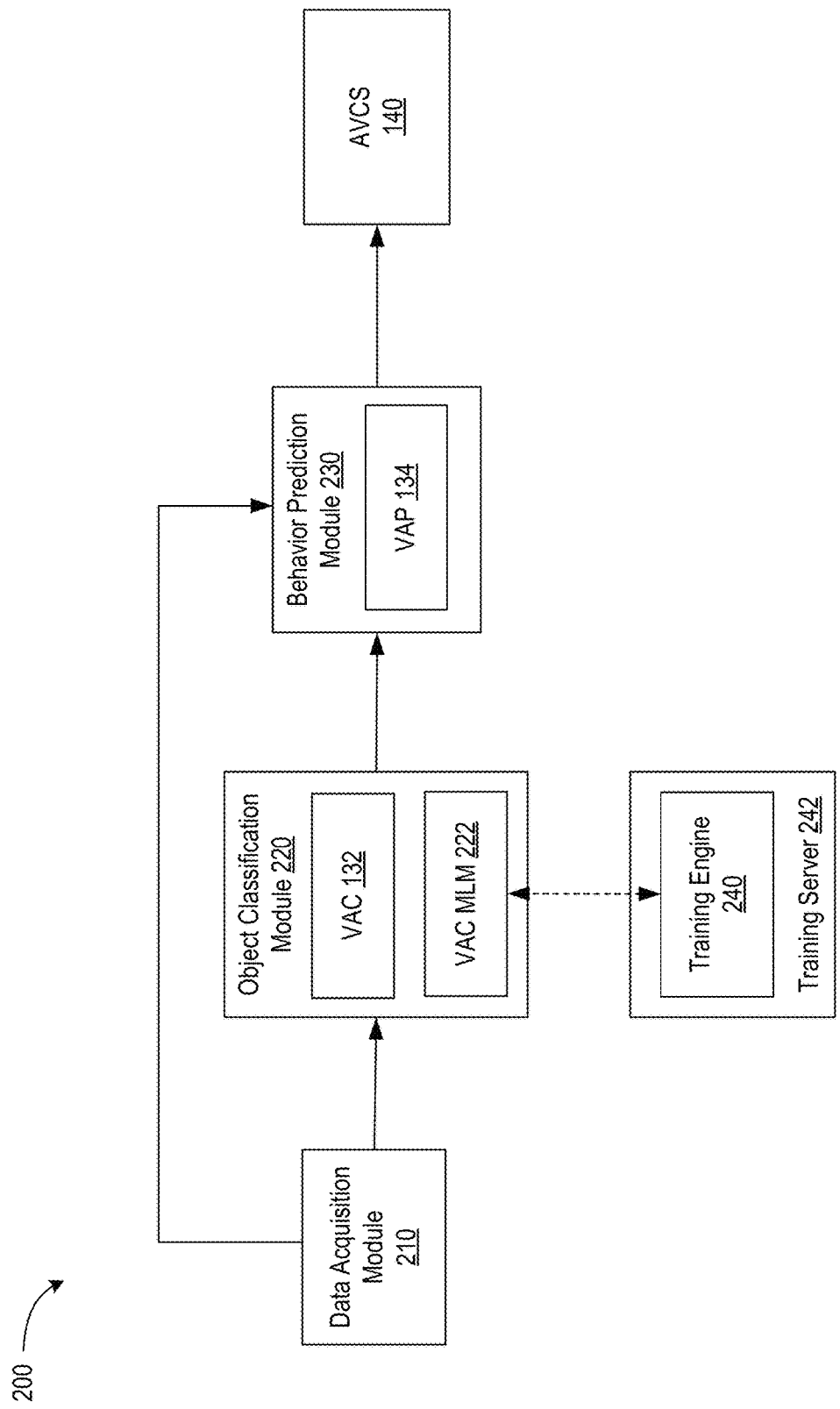
FIG. 2 is a diagram illustrating example architecture of a part of a perception system of an autonomous vehicle that is capable of using vibrometry for behavior prediction and object identification, in accordance with some implementations of the present disclosure.

FIG. 2 is a diagram illustrating example architecture 200 of a part of a perception system of an autonomous vehicle that is capable of using vibrometry for behavior prediction and object identification, in accordance with some implementations of the present disclosure. An input into the perception system (e.g., perception system 130 of FIG. 1) may be data obtained by sensing system 110 (e.g., by lidar sensor(s) 112), including distance data, radial velocity data, and vibrometry data. For example, a data acquisition module 210 may associate each return point with coordinates and radial velocities of the respective reflecting region. Various points may correspond to different frames, each frame having a timestamp. An object classification module 220 can process output of data acquisition module 180. The data processed by object classification module 220 can correspond to multiple objects in the environment. A given object can produce one or more points that include vibrometry data. In some implementations, a lidar that performs high resolution scanning of the environment (for the purpose of identifying size and shape of objects and determining distances to and velocities of those objects) can also provide vibrometry data. In some implementations, a lidar that performs the high-resolution scanning (with a large number of return points over a 360-degree view) and a lidar that collects vibrometry data can be different devices. In particular, whereas multiple vibrometry data points from a given object can be beneficial (e.g., improving signal-to-noise ratio), even a single return point from the object can often be sufficient to provide a spectral representation of the vehicle's vibration spectrum. Therefore, in some implementations, a lower resolution lidar (producing a smaller number of return points over the 360-degree view) can be used to obtain vibrometry data. As a non-limiting example, while a range/velocimetry lidar can produce 1000 points over the 360-degree view, a dedicated vibrometry lidar can produce 100 or 50 points over the same view. Such a reduction of the number of points can allow the dedicated vibrometry lidar to dwell longer on each point and thus collect accurate vibrations spectral data. At the same time, reduction in the number of points can be acceptable from a resolution standpoint because vibrometry data is likely to be of most utility at shorter distances where a sparser coverage can be sufficient. This is because parked vehicles or vehicles that are about to execute a sudden change in motion are of greater concern if they are located nearby.

Although implementations disclosed herein refer to lidars, for brevity and conciseness, it should be understood that methods and systems disclosed can also be used with other sensing technology, e.g., with radar sensing technology, in one example.

A vibrometry lidar (or a combined range/velocity/vibrometry lidar) can produce a beam with frequency f that is subsequently split into two beams, a beam transmitted to a target and a reference beam that remains at the lidar. In some implementations, for increased sensitivity (e.g., to reduce effects of the 1/f noise) both the transmitted and the reference beam can be shifted in frequency (e.g., prior to splitting) to frequency $f+f_1$, using an optical or mechanical light modulator. A transmitted beam interacting with the target produces a reflected beam whose frequency is Doppler-shifted to the value $f+f_1+2\ v(t)/\lambda$, where $\lambda=c/f$ is the frequency of light and v(t) is the velocity of the reflecting surface along the direction of reflection (v(t)>0 if the target is approaching the lidar and v(t)<0 if the target is moving away). The reflected beam collected by the lidar (with frequency $f+f_1+2\ v(t)/\lambda$) and the reference local oscillator beam (with frequency $f+f_1$) can then both be input into a coherent photodetector. The photodetector can extract a phase difference between the two beams and produce an electronic signal modulated with the frequency difference $2\ v(t)/\lambda$. The electronic signal can be digitized and processed by a Fourier analyzer (e.g., Fast Fourier Transform circuitry) and the presence of various vibration frequencies in the velocity 2 v(t)/can be identified. The velocity v(t) of the target surface, as probed by the Fourier analyzer, e.g., $$v(t) = v_0 + \sum_m v_m \cos(\omega_m t + \alpha_m)$$

can include the net velocity $v_0$ of the target surface relative to the lidar (e.g., the velocity with which the AV is approaching a parked vehicle) as well as amplitudes $v_m$ of various harmonics (having angular frequencies $\omega_m$) that are representative of the vibrations of the target object.

The set of frequencies $\{\omega_m\}$ and/or amplitudes $\{v_m\}$ (and, in some implementations, at least some phases $\{\alpha_m\}$) can represent a fingerprint of vibrations (FoV) of the target object. Different mechanical modes can be represented to a different degree in the FoV. For example, a first (highest amplitude) 11 mode can be associated with RPM of the object's engine, e.g., $\omega_1=2\pi\times\text{RPM}$. Other modes can include harmonics of the first mode, e.g., $2\omega_1$, $3\omega_1$, $4\omega_1$ .... Because a vehicle can be a complex and nonlinear mechanical system, many other additional harmonics can be induced by the idling engine or a combination of vibration of the running engine, drivetrain rotations, wheel rotations, aerodynamic drag force fluctuations, and the like, including harmonics that arise from an interplay of various harmonics of individual parts of the vehicle. In some implementations, instead of (or in addition) to the Fourier analysis of the vibration spectra, a zero-crossing rate of the vibrometry signal can be determined. Specifically, a rate at which the signal changes from positive to negative can be determined. The rate of change can be determined for a signal (e.g., baseband signal) obtained after the removal of the offset signal.

Object classification module 220 can include VAC 132 that classifies movable objects based on vibration spectra provided by the data acquisition module 210. In various implementations, the extent to which the object classification module uses vibration spectra can vary. In some implementations, one or a few most prominent harmonics $\omega_m$ (with highest amplitudes $v_m$) are used by VAC 132. For example, in a minimum model, the main (e.g., RPM) frequency $\omega_1$ can be used. In some implementations, many harmonics $\omega_m$ can be used. In some implementations, multiple harmonics $\omega_m$ together with the respective amplitudes $v_m$ can be used. In some implementations, object classification can be facilitated by one or more VAC machine learning models VAC MLM 222. A human ear is often capable of identifying a type of a vehicle based on the sound the vehicle produces and distinguish a passenger car from a motorcycle or a semi-truck, and do so the more reliably the less other traffic noise is present. Lidar vibrometry emulates these favorable conditions. Because a lidar is selectively sensing mechanical motion of a body of a vehicle, presence of other vehicles (as well as the noise produced by those vehicles) is of little detriment to the measurements (if other vehicles do not obscure the direct view of the target vehicle). Trained VAC MLM 222 can use the spectral FoV of a target vehicle as an input and determine the type (and in some implementations, make and model) of the target vehicle, as described in more detail below in conjunction with FIG. 5. Other inputs into VAC MLM 222 can include images of the target vehicle and various contextual information, such as the speed of the target vehicle, the type of the driving setting (highway, city, rural, etc.)

VAC MLM 222 can be trained using vibration spectra of various vehicles as well as images of those vehicles and other contextual information as training inputs. Training can be performed by a training engine 240, which can be hosted by a training server 242, which can be an outside server that includes one or more computing devices. For example, VAC MLM 222 can be trained by training engine 240 and subsequently downloaded onto the perception system 130 of the AV 100. VAC MLM 222 can be a decision-tree algorithm, a support vector machine, a deep neural network, and the like. Deep neural networks can include convolutional neural networks, recurrent neural networks, fully connected neural networks, long short-term memory neural networks, Boltzmann machines, and so on.

Training engine 240 can construct VAC MLM 222, e.g., by first selecting a type and architecture of MLM to be implemented (e.g., a fully connected neural network with four hidden layers of neurons). Training engine 240 can access or generate training data that includes training inputs and corresponding target outputs (correct matches for the respective training inputs). During training of VAC MLM 222, training engine 240 can find patterns in the training data that map each training input to the respective target output. For example, the training engine 240 can select a number of vibration spectra (and other data) as training inputs. Training engine 240 can also access or prepare mapping data that maps training inputs to the target outputs. Mapping data can include identification of at least some of the types of vehicles associated with respective vibration spectra (and other data). For example, a first vibration spectrum can be mapped in the mapping data as associated with object "motorcycle," whereas a second vibration spectrum can be associated with object "passenger car," and so on.

During training of VAC MLM 222, training engine 240 can change parameters (e.g., weights and biases of a neural network) until VAC MLM 222 is able to correctly identify the type of vehicles in the provided training inputs. Additional training inputs (e.g., inputs not used in training) can then be used for independent verification (certification) of the performed training. If VAC MLM 222 successfully identifies less than a certain threshold percentage of types of vehicles during verification, training engine 240 can initiate additional training of the VAC MLM 222. After completion of training, VAC MLM 222 can be downloaded to the AV and used for inference of types of vehicles encountered in actual driving conditions.

The perception system can include behavior prediction module 230, which can receive data from the object classification module 220 and/or directly from the data acquisition module 210. Behavior prediction module 230 can include VAP 134 that predicts motion changes of various movable objects based on detected, by the sensing system, vibration spectra of those movable objects. As described in more detail below in conjunction with FIG. 3, the behavior prediction module 230 can associate vibrations (e.g., caused by an idling engine) of a car stopped on or near a roadway with a likelihood that the car can rejoin the traffic within a certain time horizon (e.g., before the AV has driven past the stopped car). Electric trains (or other electric vehicles) can have distinct low-frequency vibrations spectra (e.g., related to local power conversion system charge-discharge cycles with frequency of the order of 100 Hz) that VAP 134 (or VAC 132) can distinguish from combustible engine-caused noise. Similarly, the behavior prediction module 230 can associate an absence of engine vibrations with a car whose engine is turned off and which is, therefore, unlikely, for at least a certain amount of time (e.g., several seconds or more) to move, join the traffic, and so on. Additionally, as described in conjunction with FIG. 4, the behavior prediction module 230 can associate an increase in engine RPM of a vehicle travelling on a road with a likelihood that the vehicle is about to execute a driving maneuver, such as a lane change and/or overtaking, which can interfere with a driving trajectory of the AV. The behavior prediction module 230 can also forecast velocity and acceleration/deceleration of various other objects identified using range/velocity data with or without lidar velocimetry.

Predictions of the behavior prediction module 230 can be provided to AVCS 140. AVCS 140 evaluates the provided predictions and determines whether to modify the current driving trajectory of the AV. For example, if an idling car is identified within a certain distance from the driving trajectory, AVCS 140 can slow the AV down to a speed, which ensures a shorter stopping distance in case the idling car accelerates suddenly. Alternatively, AVCS 140 can change lanes, if an adjacent lane is free from obstructions, or perform some other defensive driving maneuver.

Figure 3:
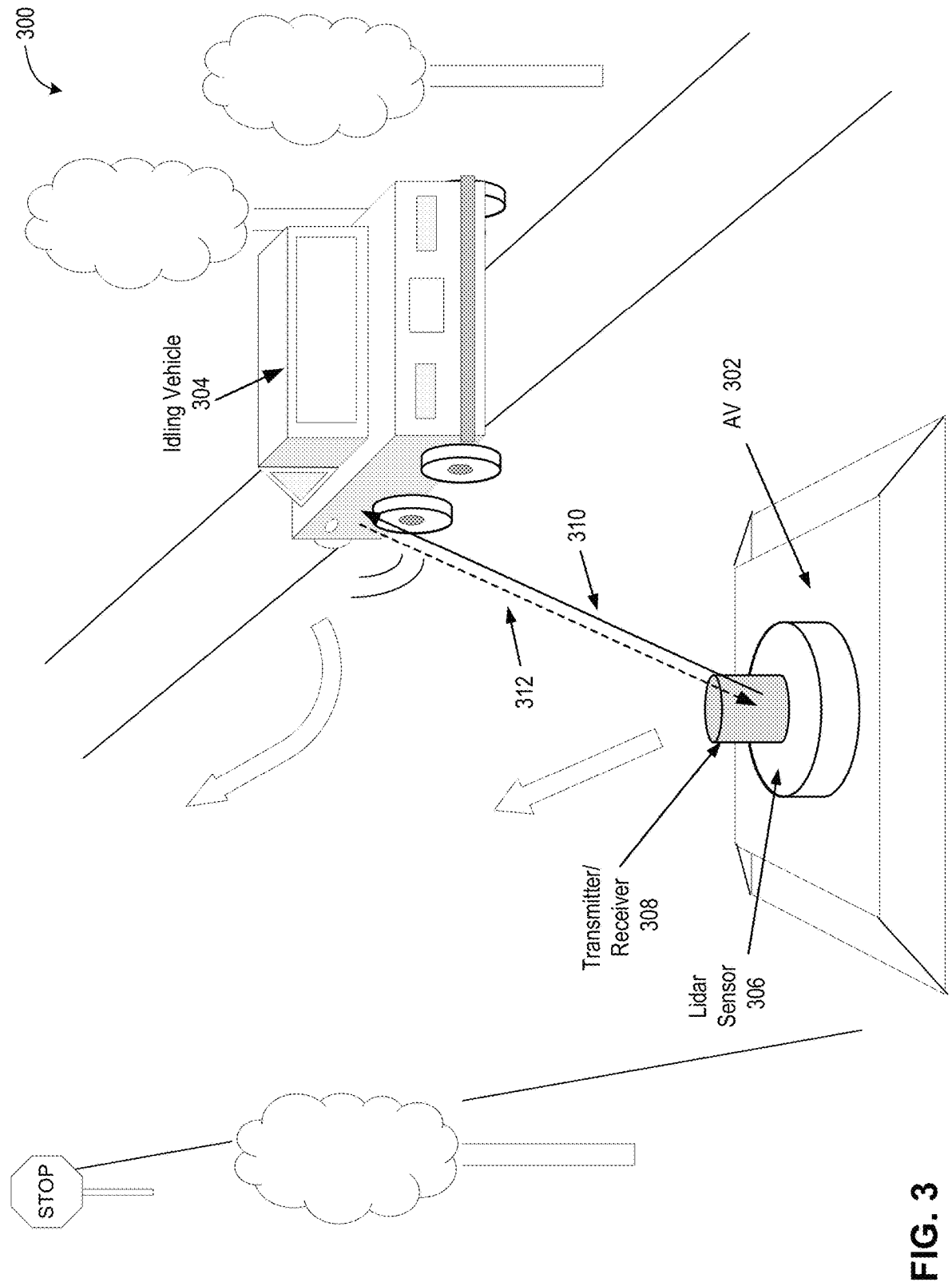
FIG. 3 is an illustration of a lidar vibrometry setup for identification of an idling vehicle, in accordance with some implementations of the present disclosure.

FIG. 3 is an illustration of a lidar vibrometry setup 300 for identification of an idling vehicle, in accordance with some implementations of the present disclosure. Depicted in FIG. 3 is a part of the AV 302 with a lidar sensor 306 mounted thereon. Lidar sensor 306 can include a scanning transmitter/receiver 308 that outputs a transmitted beam 310 and receives a reflected, from an idling vehicle 304, beam 312. The transmitter/receiver 308 can obtain one or more return points from the idling vehicle 304 per sensing frame and can observe the idling vehicle 304 over one or more sensing frames. Each return point can be obtained using a lidar signal representative of the vibration spectrum of vibrations of the idling vehicle 304, as described in more detail above in relation to FIG. 2. The vibration spectrum can include at least a frequency of the engine RPM, e.g., $\omega_1$. VAP 134 can identify the engine RPM frequency $\omega_1$ as being within a frequency interval of an idling engine, e.g., $2\pi \times 500$ to $2\pi \times 1000$ RPM. Responsive to such determination, VAP 134 can predict that the idling vehicle 304 is capable of veering into traffic (as depicted schematically with the open arrow) in front of the AV 302. Responsive to receiving such a prediction, the AVCS 140 can cause the AV 302 to perform a first modification of its driving trajectory, e.g., to slow down or move towards the left side of the roadway. In some implementations, the transmitter/receiver 308 can continue monitoring the idling vehicle 304 with subsequent sensing frames. If it is determined that the engine RPM frequency $\omega_1$ has changed (e.g. increased), VAP 134 can predict that the vehicle is no longer idling and has begun moving onto the roadway. Responsive to receiving this new prediction, the AVCS 140 can cause the AV 304 to perform a second modification of its driving trajectory, e.g., to further reduce speed by harder braking and, possibly, coming to a complete stop.

Figure 4:
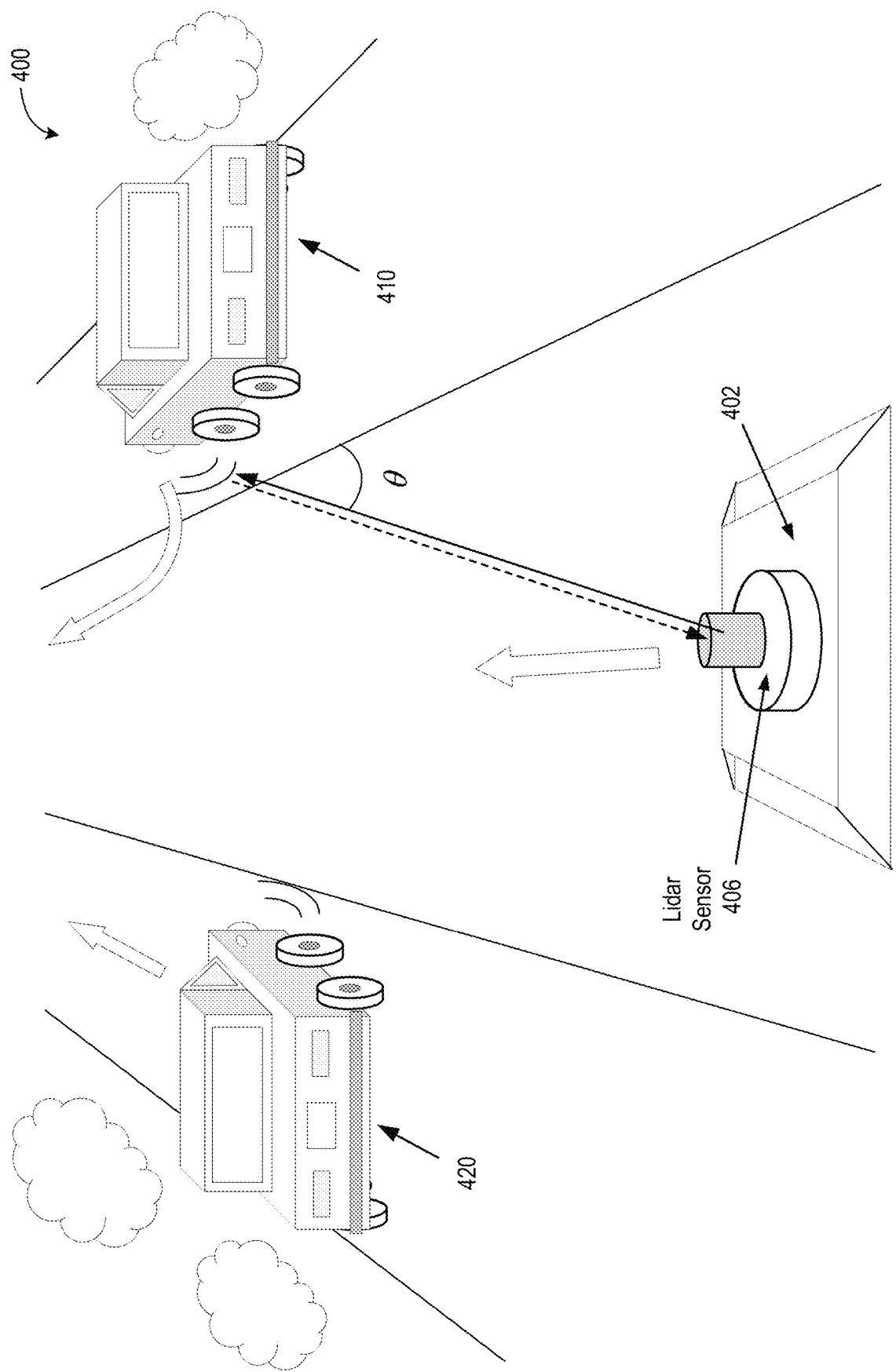
FIG. 4 is an illustration of a lidar vibrometry setup for prediction of motion changes of a moving vehicle, in accordance with some implementations of the present disclosure.

FIG. 4 is an illustration of a lidar vibrometry setup 400 for prediction of motion changes of a moving vehicle, in accordance with some implementations of the present disclosure. Depicted in FIG. 4 is a part of the AV 402 travelling in a middle lane of a three-lane highway. The AV 402 deploys a lidar sensor 406 to collect sensing frames. The driving environment of the AV 402, as illustrated, includes vehicle 410 and vehicle 420 travelling in the right lane and the left lane, respectively. Lidar sensor 406 can include a range/velocity lidar, such as a coherent (e.g., FMCW) lidar or a hybrid coherent/ToF lidar. Lidar sensor 406 can include a vibrometry lidar, which can be a separate lidar or a coherent lidar configured for identification of a range, velocity, and vibration spectra. For example, lidar sensor 406 can be an FMCW lidar that outputs a frequency-modulated beam having radio frequency modulation consisting of (periodically repeating) 1) a region of increasing frequency (chirp-up region), 2) a region of decreasing frequency (chirp-down region), and 3) a region of a constant frequency. The chirp-up and chirp-down regions can be used as reference features to identify a time delay between the reference features in the reflected beam and similar reference features in the local oscillator copy of the transmitted beam. The flat region can be used for Doppler velocimetry and vibrometry as described above in conjunction with FIG. 2. In some implementations, no flat region may be present and a simpler sequence of chirp-up and chirp down regions can be used. In such implementations, the difference in peak positions can be augmented with the width of the beat frequency peaks.

Based on the lidar vibrometry data provided by the sensing system, VAP 134 can determine and monitor engine RPM of vehicle 410 (and, similarly, of vehicle 420). In some implementations, the lidar vibrometry data can provide information about the acceleration of vehicle 410 faster and more accurately than the velocimetry data alone. More specifically, if the lidar sensor 406 detects velocity of vehicle 410 at two different times (e.g. consecutive frames), $v(t_1)$ and $v(t_2)$, acceleration could be estimated as $a=[v(t_2)-v(t_1)]/[t_2-t_1]$. For small time intervals, however, a ratio of two small quantities $v(t_2)-v(t_1)$ and $t_2-t_1$ can result in an estimate with an accuracy that is less than desirable. Increasing the interval $t_2-t_1$ (e.g., by waiting for additional sensing frames), while possibly improving accuracy, delays a valuable identification of a motion change by vehicle 410.

Vibrometry data, on the other hand can enable a faster and more accurate determination of the vehicle's acceleration, since the measured RPM represents a direct probe of the acceleration. More specifically, as long as the tires of the vehicle do not slip and the vehicle's transfer case maintains the same drive coupling ratio (e.g., remains in the same gear), the relation of the velocity of the vehicle and the engine's RPM can be a proportional one, $$v(t) = \beta \cdot \text{RPM}(t),$$

or, equivalently, $$\ln[v(t)] = \ln\beta + \ln[\text{RPM}(t)],$$

with a vehicle-specific (and gear-specific) coefficient $\beta$. The increment of the logarithm of the RPM, therefore, is related to the acceleration in a way that is independent of fixed coefficient $\beta$:

$$\frac{1}{v(t)}\frac{\Delta v}{\Delta t} = \frac{\Delta \ln[RPM(t)]}{\Delta t}.$$

Accordingly, the acceleration $a=\Delta v/\Delta t$, can be determined based on two RPM measurements, $RPM(t_1)$ and $RPM(t_2)$, as follows:

$$a = \frac{v}{t_2 - t_1} \ln\frac{RPM(t_2)}{RPM(t_1)},$$

where (because of a slow velocity change over time $t_2-t_1$) the velocity value v can be determined at time $t_1$ ($v=v(t_1)$), or at time $t_2$ ($v=v(t_2)$), or as some average of the two values, e.g., $v=[v(t_1)+v(t_2)]/2$, or $v=\sqrt{v(t_1)v(t_2)}$, or the like. The velocity value v can, therefore, be determined using one (or both frames) using coherent lidar velocimetry data. In some implementations, instead of the logarithm of the ratio of RPMs, a difference can be used:

$$\ln\frac{RPM(t_2)}{RPM(t_1)} \to (RPM(t_2) - RPM(t_1))/RPM_{av},$$

with some average $RPM_{av}$ value (e.g., selected similarly to how the velocity value v is selected).

In some implementations, directional corrections can be taken into account for additional accuracy of acceleration detection. More specifically, the velocity determined by the coherent lidar (the radial velocity) can be less than the actual velocity value v by the cosine of the angle $\theta$ between the direction of the lidar beams and the direction of motion of the vehicle 410. The angle θ can be known from 1) a road layout data (e.g., based on one or more images obtained by camera(s) 118), with the road edges serving as an indicator of the direction of traffic and from, and 2) a known direction of the beam propagation (which is controlled by control electronics of the lidar transmitter/receiver). To account for the reduction in the radial velocity, compared with the actual velocity of vehicle 410, the determination of the acceleration can be performed according to $$a = \frac{v}{(t_2 - t_1)\cos\theta} \ln \frac{RPM(t_2)}{RPM(t_1)}.$$

Similarly to the velocity value v, the angle θ can be determined at time $t_1$, time $t_2$, or as some average of the two values $\theta(t_1)$ and $\theta(t_2)$.

In some implementations, accelerations a that are smaller than a certain threshold acceleration do can be attributed to standard fluctuations caused by driver's non-uniform control of the acceleration pedal, unevenness of the road terrain, wind gusts, and the like. Accelerations a above the threshold $a_0$, on the other hand, can trigger a response from the AVCS 140. Specifically, responsive to the determination that the identified acceleration a of vehicle 410 is above the threshold do, VAP 134 can predict that vehicle 410 is likely to perform some driving maneuver, such as changing lanes, cutting in front of the AV 402, and/or decelerating in front of the AV 402 (or some other vehicle that is positioned in some vicinity of the AV 402). Responsive to receiving such a prediction, the AVCS 140 can cause the AV 402 to perform a modification of its driving trajectory, e.g., by braking or moving the AV to the left lane (provided that position of vehicle 420 allows to perform such a lane change safely).

Figure 5:
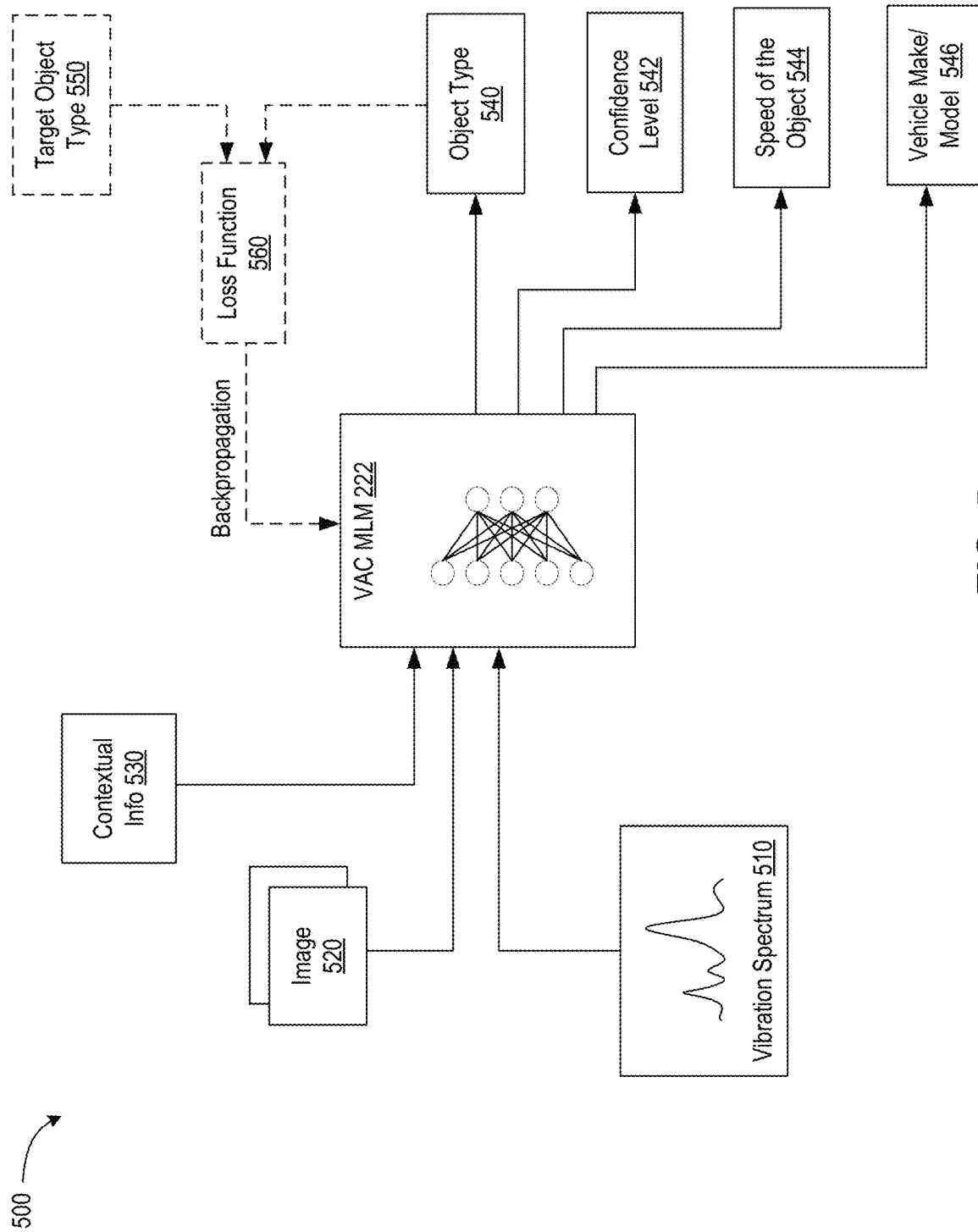
FIG. 5 is a schematic diagram depicting training and inference operations of a machine learning model that is used to identify a type of a vehicle and other vehicle information using lidar vibrometry data, in accordance with some implementations of the present disclosure.

FIG. 5 is a schematic diagram depicting training and inference operations 500 of a machine learning model that is used to identify a type of a vehicle and other vehicle information using lidar vibrometry data, in accordance with some implementations of the present disclosure. In some implementations, the machine learning model deployed in operations 500 can be a vibrometry-assisted classification model (VAC MLM) 222 referenced in conjunction with FIG. 2. Although depicted schematically as a neural network model, VAC MLM 222 can also be (or include) a decision-tree MLM, a support vector machine, or a combination of various MLMs of different types, including but not limited to a combination of a decision-tree MLM and a deep neural network MLM. In some implementations, VAC MLM 222 can include multiple neural network models trained separately, e.g., consecutively, one after another. For example, VAC MLM 222 can include a first neural network model that determines a type of a vehicle (or other movable object) and a second neural network model that determines make/model of the vehicle. The second neural network model can be trained after the first neural network model is trained and can use the output of the first neural network model as one of the inputs.

VAC MLM 222 can be a deep neural network having multiple hidden layers. Any of the layers (or groups of layers) can be fully connected layers or partially connected layers. In different implementations, different architectures (e.g., different numbers of neuron layers and different topologies of neural connections) can be used. VAC MLM 222 can be built and trained by a training engine 240 of FIG. 2. During training, training engine 240 can define an architecture of VAC MLM 222 and set initial values of network parameters (including weights, biases, activation functions, etc.), e.g., randomly. During training, the network parameters are modified to ensure that processing of training inputs produces desired target outputs. Operations 500 that are performed only in training are depicted with dashed lines and dashed boxes.

Input into VAC MLM 222 can include vibrometry data for the vehicle whose type is being identified. Vibrometry data can be input as a vector of values, e.g., as values $v_n$ for a set of consecutive vibration frequencies on separated by set frequency increments Δω (e.g., $\omega_n = \omega_0 + n\Delta\omega$, beginning from some threshold frequency $\omega_0$). Each element of the vector $[v_1, v_2, v_3, \ldots]$ can be received by a separate node of an input neuron layer of VAC MLM 222, weighed, and provided via an activation function to one or more nodes of the next layer. In some implementations, one or more images 520 of the object can be input into VAC MLM 222. Images 520 can be images obtained by camera(s) 118 of the sensing system 110 of the AV. In some implementations, images 520 can be input into a convolutional subnetwork of VAC MLM 222 trained for processing of images. In some implementations, additional input into VAC MLM 222 can include contextual information 530. Contextual information 530 can be provided by the perception system 130 or the data processing system of the AV. For example, contextual information can identify a velocity of the vehicle. In some implementations, the velocity of the vehicle can be identified coarsely, as being in a certain bucket of velocities, e.g., velocity in the range 0-20 mph can be characterized by (bucket) value 0, velocity in the range 20-40 mph can be characterized by value 1, and so on. Additional contextual information can include a parameter that specifies a type of driving conditions (e.g., city driving, paved highway driving, unpaved road driving, off-road driving, and the like).

Output of VAC MLM 222 can be an object type 540 of the vehicle, which can be a motorcycle, a passenger car, a sports car, a sports utility vehicle, an all-terrain vehicle, a light truck, a heavy truck, a bus, a rail vehicle, and so on. In some implementations, the output can be a vector in an N-dimensional space of object types, e.g., with a vector [1,0,0, . . . ] corresponding to a motorcycle predicted with certainty, vector [0,1,0, . . . ] corresponding to a passenger car predicted with certainty, and so on. In some instances, the output can be a vector representing probabilities of the various object types, e.g., the output vector [0.1, 0.8, 0.05, . . . ] can indicate that the object is identified as a passenger car with a 85% probability, as a motorcycle with a 10% probability, as a light truck with 5% probability, and so on. In some implementations, VAC 132 can provide both the highest probability object type and the numerical value of that probability (as a confidence level 542) to the AVCS 140. In the above example, VAC 132 can provide to the AVCS 140 that the identified object type is a passenger car with a 85% confidence level. In some implementations, VAC MLM 222 is further trained to output a speed of the object (block 544) and a vehicle make and model of the object (block 546).

During training, the predicted object type 540 can be compared with a target object type 550. For example, a loss function 560 can be used to determine the difference between the predicted object type and the target object type. The training engine 240 can then backpropagate the determined difference through the layers of VAC MLM 222 and adjust parameters of neural nodes to minimize the determined difference. Similarly, the predicted speed of the object 544 can be compared with the target speed of the object (not shown explicitly in FIG. 5 for the ease of viewing). The process of prediction, loss evaluation, and backpropagation can be performed for additional training inputs until a target success rate (and confidence level) of object identification (e.g., type/speed/make/model) is achieved. The trained VAC MLM 222 can then be provided (e.g., downloaded) to the perception system of the AV.

Figure 6:
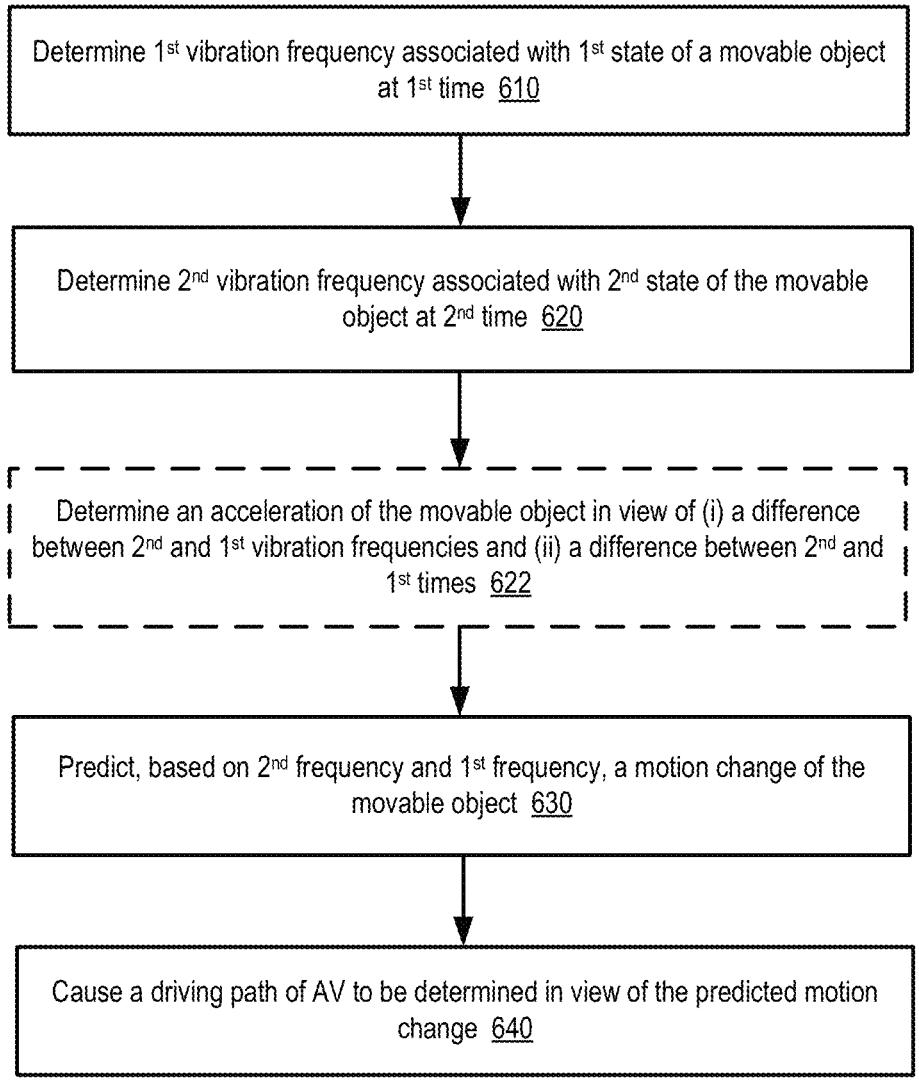
FIG. 6 illustrates an example method of using lidar vibrometry for predicting a motion change of a moving vehicle, in accordance with some implementations of the present disclosure.
Figure 7:
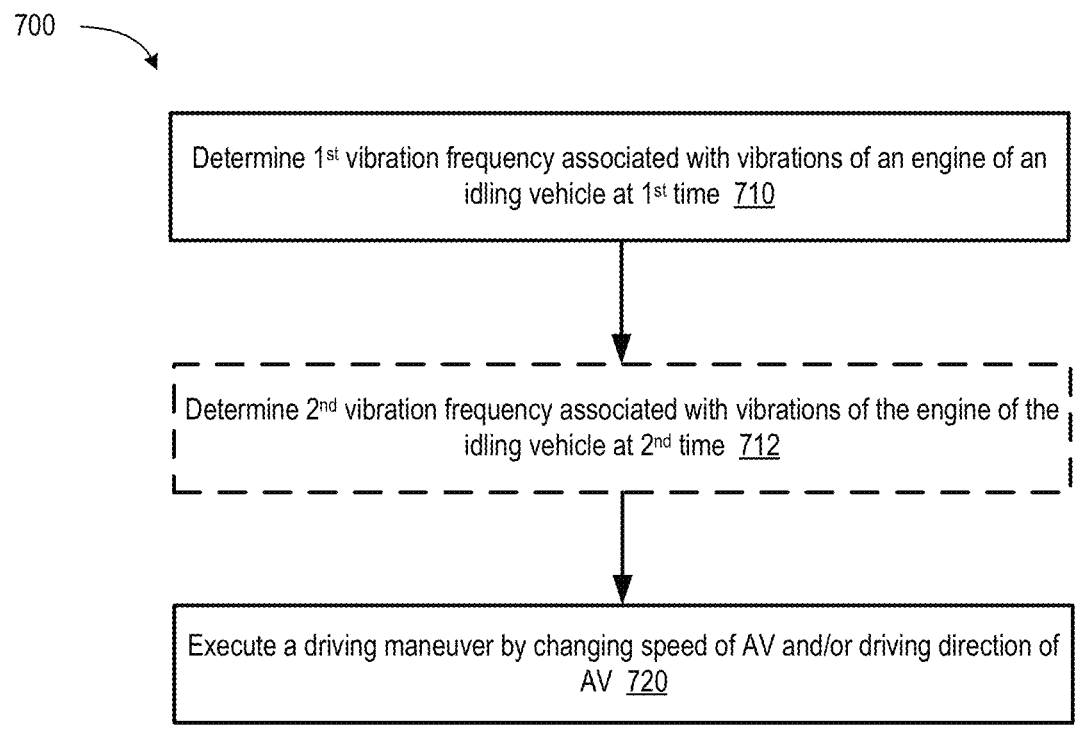
FIG. 7 illustrates an example method of using lidar vibrometry for predicting an onset of a motion of an idling vehicle, in accordance with some implementations of the present disclosure.
Figure 8:
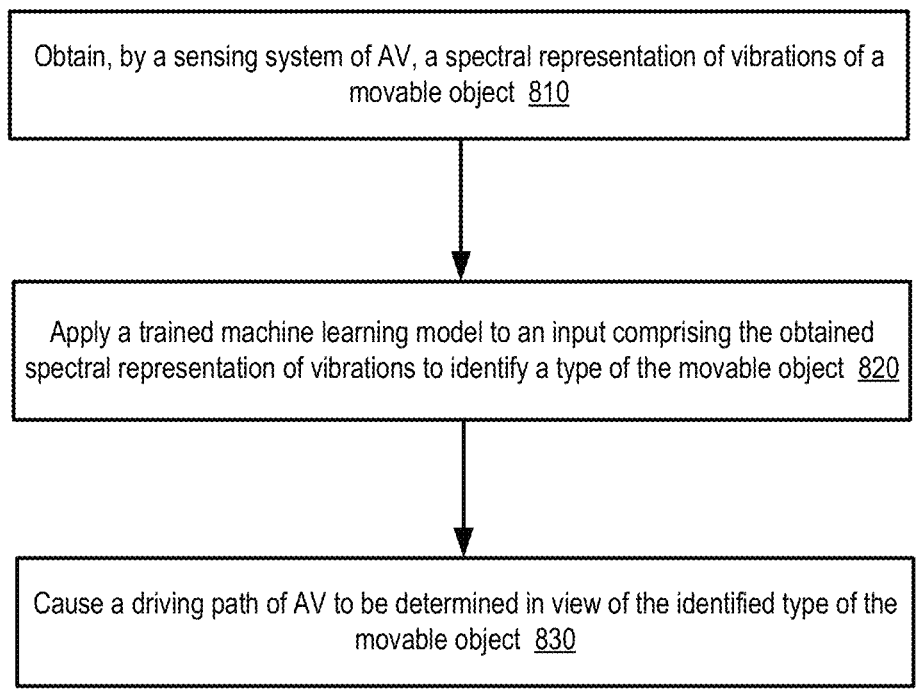
FIG. 8 illustrates an example method of using a machine learning model to classify objects based on lidar vibrometry data, in accordance with some implementations of the present disclosure.

FIGS. 6-8 illustrate example methods 600-800 of using lidar vibrometry data in autonomous driving. A processing device, having one or more processing units (CPU) and memory devices communicatively coupled to the CPU, can perform methods 600-800 and/or each of their individual functions, routines, subroutines, or operations. The processing device executing methods 600-800 can perform instructions issue by various components of the perception system 130, e.g., VAC 132 (including VAC MLM 222), and/or VAP 134. Methods 600-800 can be directed to systems and components of an autonomous driving vehicle, such as the autonomous vehicle 100 of FIG. 1. Methods 600-800 can be used to improve performance of the autonomous vehicle data processing system 120 and/or the autonomous vehicle control system 140. In certain implementations, a single processing thread can perform methods 600-800. Alternatively, two or more processing threads can perform methods 600-800, each thread executing one or more individual functions, routines, subroutines, or operations of the methods. In an illustrative example, the processing threads implementing methods 600-800 can be synchronized (e.g., using semaphores, critical sections, and/or other thread synchronization mechanisms). Alternatively, the processing threads implementing methods 600-800 can be executed asynchronously with respect to each other. Various operations of methods 600-800 can be performed in a different order compared with the order shown in FIGS. 6-8. Some operations of methods 600-800 can be performed concurrently with other operations. Some operations can be optional.

FIG. 6 illustrates an example method 600 of using lidar vibrometry for predicting a motion change of a moving vehicle, in accordance with some implementations of the present disclosure. At block 610, method 600 can include determining, by a sensing system of an autonomous vehicle (AV), a first vibration frequency associated with a first state of a movable object at a first time. For example, the first vibration frequency may be a frequency associated with a number of revolutions of an engine of the movable object per unit of time (e.g., $RPM_1$ frequency of the engine at time $t_1$). At block 620, method 600 can continue with determining a second vibration frequency associated with a second state of the movable object at a second time (e.g., $RPM_2$ frequency of the engine at time $t_2$). The second time $t_2$ can be later than the first time $t_2 > t_1$.

At block 630, method 600 can continue with predicting, based on an identification that the second vibration frequency is different from the first vibration frequency, a likely motion change of the movable object. For example, the increase in the engine frequency, $RPM_2 > RPM_1$, can be used as a predictor that the movable object is about to execute a driving maneuver. In those instances, where the lane occupied by the movable object has one or more other vehicles in front of the movable object, it is likely that the movable object is about to move to a different lane, e.g., the lane occupied by the AV. As a result, at block 640, the method can continue with causing a driving path of the AV to be determined (e.g., modified) in view of the predicted motion change. For example, the predicted motion change can be a lane change by the movable object and the modified driving path of the AV can include slowing down (e.g., by braking or easing off the throttle), performing a defensive maneuver (e.g., changing lanes or moving away from the movable object), and so on.

In some implementations, predicting the motion change of the movable object can be based on acceleration of the movable object. For example, as indicated by an optional block 622, method 600 can include determining an acceleration of the movable object in view of (i) a difference between the second vibration frequency and the first vibration frequency (e.g., $RPM_2 - RPM_1$) and (ii) a difference between the second time and the first time (e.g., $t_2 - t_1$). In some implementations, in lieu of the difference $RPM_2 - RPM_1$, a logarithm of the ratio can be determined: ln $[RPM_2/RPM_1]$. To determine acceleration, the difference of the RPMs can be divided by the difference of times $t_2 - t_1$ and further multiplied by a velocity of the movable object, as described in more detail in relation to FIG. 4. The velocity of the movable object, as used in determination of the acceleration, can be identified, using the sensing system of the AV (e.g., by a lidar device) at one or both of the first time, $v(t_1)$, and/or the second time, $v(t_2)$. In some implementations, some average of $v(t_1)$ and $v(t_2)$ can be used. In some implementations, the acceleration of the movable object is determined in further view of an image of an environment of the movable object. For example, one or more images obtained using the sensing system of the AV (e.g., camera(s) 118) can indicate positioning of the movable object relative to the roadway and relative to the AV. Using the obtained positioning of the movable object, the perception system of the AV can determine an angle between the direction of the velocity-sensing lidar beam and the direction of the velocity of the movable object and use the determined angle to obtain a more accurate estimate of the object's acceleration. The estimate of the acceleration can be used in a decision whether to implement a change in the driving path of the AV. For example, the change can implemented provided that the acceleration is above a certain (empirically-determined) threshold. If the acceleration is less than the threshold, the current driving path of the AV can be maintained.

FIG. 7 illustrates an example method 700 of using lidar vibrometry for predicting an onset of a motion of an idling vehicle, in accordance with some implementations of the present disclosure. At block 710, method 700 can include determining (e.g., by a sensing system of an AV) a first vibration frequency associated with vibrations of an engine of an idling stationary vehicle at a first time, e.g., $RPM_1$ at time $t_1$. For example, the first vibration frequency can be identified based on a frequency modulation of a light beam reflected from the idling vehicle and detected by the sensing system of the AV. In some implementations, as shown by block 720, responsive to determining that the first vibration frequency is within an idling range of engine RPMs, method 700 can continue with executing a driving maneuver that includes at least one of a change in a speed of the AV or a change in a driving direction of the AV.

In some implementations, a driving maneuver is executed based on engine-induced vibrations detected at a single (e.g., first) instance of time. In other implementations, a driving maneuver is performed responsive to a change of the engine RPM of an idling vehicle followed a period of observation of the idling vehicle. In such implementations, the first time is not the earliest instance when engine-caused vibrations are detected in the idling vehicle by the sensing system. For example, as depicted by an optional block 712, at an earlier time (herein referred to as a second time $t_2$) than the first time, $t_2 < t_1$, a second $RPM_2$ could have been detected. Based on the $RPM_2$ being within a range of idling frequencies, the sensing system of the AV can monitor vibrations of the idling vehicle while the control system (e.g., AVCS 140) makes no correction to the driving path of the AV. Subsequently, upon determining that the first (later detected) vibration frequency is higher than the second vibration frequency, $RPM_1 > RPM_2$, the control system executes a driving maneuver, the increase in the vibration frequency being used as a predictor that the idling vehicle is about to start moving.

FIG. 8 illustrates an example method 800 of using a machine learning model to classify objects based on lidar vibrometry data, in accordance with some implementations of the present disclosure. At block 810, method 800 can include obtaining, by a sensing system of an autonomous vehicle (AV), a spectral representation of vibrations of a movable object (e.g., a vehicle). For example, the spectral representation can be obtained based on a detected frequency modulation of a light beam reflected from the movable object (e.g., by mixing the reflected light beam with a local copy of a transmitted beam and processing the difference between the two beams to obtain a baseband vibrometry signal).

At block 820, method 800 can continue with applying a trained machine learning model to an input that includes the obtained spectral representation of vibrations. The machine learning model can produce an output that identifies a type of the movable object. The type of the movable object can include at least a car, a motorcycle, a truck, or a bus. In some implementations, the input to the trained machine learning model can include one or more images of the movable object. The image(s) can be obtained by the sensing system of the AV. In some implementations, the input to the trained machine learning model can further include contextual information related to the environment of the movable object. The contextual information can also include a speed of the movable object. In other implementations, the speed of the movable object can itself be determined as additional output of the trained machine learning model. For example, the determination can be based on the spectral representation of vibrations of the movable object. In some implementations, a vehicle make/model can also be output by the trained machine learning model.

The trained machine learning model can be trained using training data that includes a plurality of spectral representations of vibrations of a respective movable object of a plurality of movable objects. In some implementations, the training data can include one or more images of each of the plurality of movable objects. In some implementations, the training data can include contextual information about the environment of the movable object, speed of the movable object, and the like.

At block 830, method 800 can continue with the control system of the AV (e.g., AVCS 140) causing a driving path of the AV to be determined in view of the identified type of the movable object. For example, the perception system can identify an object as a large truck and can, therefore, determine that the object has a large turning radius, accelerates substantially slower than other vehicles, and requires substantially larger braking distances and longer braking times. The control system can then factor a likely turning, acceleration, and braking dynamics of the object in determining the driving path of the AV while the object is in the vicinity of the AV.

Figure 9:
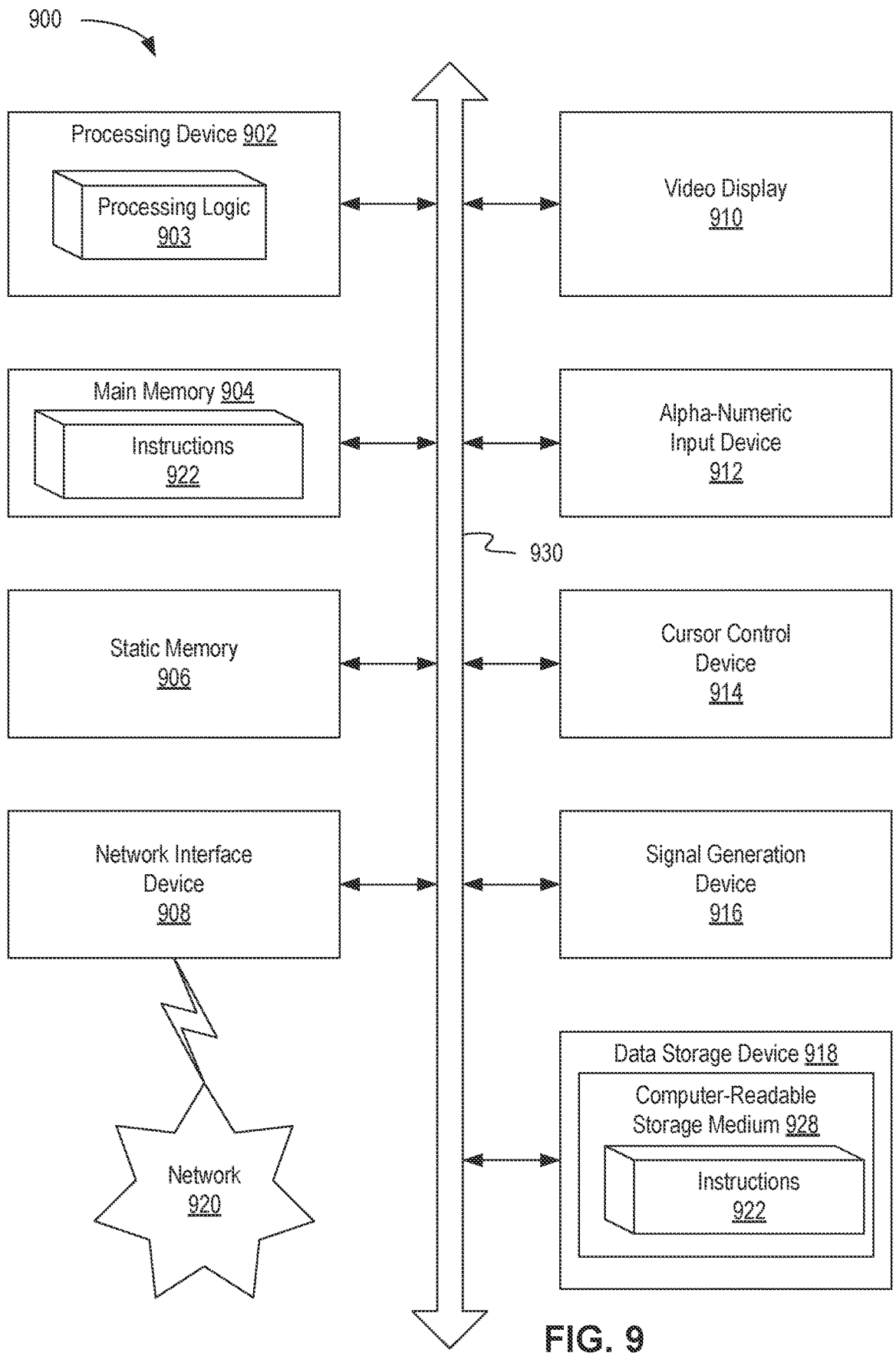
FIG. 9 depicts a block diagram of an example computer device capable of enabling the use of lidar vibrometry for classification of objects and predicting a motion change of the objects in driving environments, in accordance with some implementations of the present disclosure.

FIG. 9 depicts a block diagram of an example computer device 900 capable of enabling the use of lidar vibrometry for classification of objects and predicting a motion change of the objects in driving environments, in accordance with some implementations of the present disclosure. Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 (which can include processing logic 903) represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing method 600 of using lidar vibrometry for predicting a motion change of a moving vehicle, method 700 of using lidar vibrometry for predicting an onset of a motion of an idling vehicle, and method 800 of using a machine learning model to classify objects based on lidar vibrometry data.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing method 700 of using velocimetry data for motion pattern-assisted object classification.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   determining, by a sensing system of an autonomous vehicle (AV), a first spectral representation of vibrations associated with a first state of a movable object at a first measurement time and a second spectral representation of vibrations associated with a second state of the movable object at a second measurement time;
   identifying a first reference frequency of the first spectral representation and a second reference frequency of the second spectral representation;
   determining a value of an acceleration of the movable object based at least on the second reference frequency, the first reference frequency, and a duration between the second measurement time and the first measurement time;
   predicting, based on the determined value of the acceleration, a motion change of the movable object; and
   causing a driving path of the AV to be determined in view of the predicted motion change.

2. The method of claim 1, wherein the predicted motion change is a lane change by the movable object.

3. The method of claim 1, wherein the first reference frequency is a frequency associated with a number of revolutions of an engine of the movable object per unit of time.

4. The method of claim 1, wherein the movable object comprises a vehicle, and wherein identifying the first reference frequency and the second reference frequency of the second spectral representation comprises determining a change, from the first measurement time to the second measurement time, of a highest-amplitude vibration frequency associated with an engine of the vehicle.

5. The method of claim 4, wherein the value of the acceleration of the movable object is determined in further view of an identified, using the sensing system of the AV, velocity of the movable object at one or both of the first measurement time or the second measurement time.

6. The method of claim 4, wherein the value of the acceleration of the movable object is determined in further view of an image of an environment of the movable object, wherein the image of the environment is obtained using the sensing system of the AV.

7. The method of claim 4, wherein the value of the acceleration of the movable object is determined in further view of an angle between a first direction of motion of the movable object and a second direction from the AV to the movable object.

8. A system comprising:
a sensing system of an autonomous vehicle (AV), the sensing system configured to:
determine a first spectral representation of vibrations associated with a first state of a movable object at a first measurement time and a second spectral representation of vibrations associated with a second state of the movable object at a second measurement time;
identify a first reference frequency of the first spectral representation and a second reference frequency of the second spectral representation;
determine a value of an acceleration of the movable object based at least on the second reference frequency, the first reference frequency, and a duration between the second measurement time and the first measurement time; and
predict, based on the determined value of the acceleration, a motion change of the movable object; and
a control system of the AV communicatively coupled to the sensing system, the control system configured to:
cause a driving path of the AV to be determined in view of the predicted motion change.

9. The system of claim 8, wherein the predicted motion change is a lane change by the movable object.

10. The system of claim 8, wherein the first reference frequency is a frequency associated with a number of revolutions of an engine of the movable object per unit of time.

11. The system of claim 8, wherein the movable object comprises a vehicle, and wherein identifying the first reference frequency and the second reference frequency of the second spectral representation comprises determining a change, from the first measurement time to the second measurement time, of a highest-amplitude vibration frequency associated with an engine of the vehicle.

12. The system of claim 11, wherein the value of the acceleration of the movable object is determined in further view of an identified, using the sensing system of the AV, velocity of the movable object at one or both of the first measurement time or the second measurement time.

13. The system of claim 11, wherein the value of the acceleration of the movable object is determined in further view of an image of an environment of the movable object, wherein the image of the environment is obtained using the sensing system of the AV.

14. The system of claim 11, wherein the value of the acceleration of the movable object is determined in further view of an angle between a first direction of motion of the movable object and a second direction from the AV to the movable object.

15. An autonomous vehicle (AV), comprising:
a sensing system configured to:
determine a first spectral representation of vibrations associated with a first state of a movable object at a first measurement time and a second spectral representation of vibrations associated with a second state of the movable object at a second measurement time;
identify a first reference frequency of the first spectral representation and a second reference frequency of the second spectral representation;
determine a value of an acceleration of the movable object based at least on the second reference frequency, the first reference frequency, and a duration between the second measurement time and the first measurement time; and
predict, based on the determined value of the acceleration, a motion change of the movable object; and
a control system communicatively coupled to the sensing system, the control system configured to:
cause a driving path of the AV to be determined in view of the predicted motion change.

16. The AV of claim 15, wherein the predicted motion change is a lane change by the movable object.

17. The AV of claim 15, wherein the first reference frequency is a frequency associated with a number of revolutions of an engine of the movable object per unit of time.

18. The AV of claim 15, wherein the movable object comprises a vehicle, and wherein identifying the first reference frequency and the second reference frequency of the second spectral representation comprises determining a change, from the first measurement time to the second measurement time, of a highest-amplitude vibration frequency associated with an engine of the vehicle.

19. The AV of claim 18, wherein the value of the acceleration of the movable object is determined in further view of an identified, using the sensing system of the AV, velocity of the movable object at one or both of the first measurement time or the second measurement time.

20. The AV of claim 18, wherein the value of the acceleration of the movable object is determined in further view of an angle between a first direction of motion of the movable object and a second direction from the AV to the movable object.

* * * * *